Feb. 3, 1970  J. F. BLACK  3,493,754
MULTIFREQUENCY LASER IMAGE CONVERTER
Filed March 25, 1968
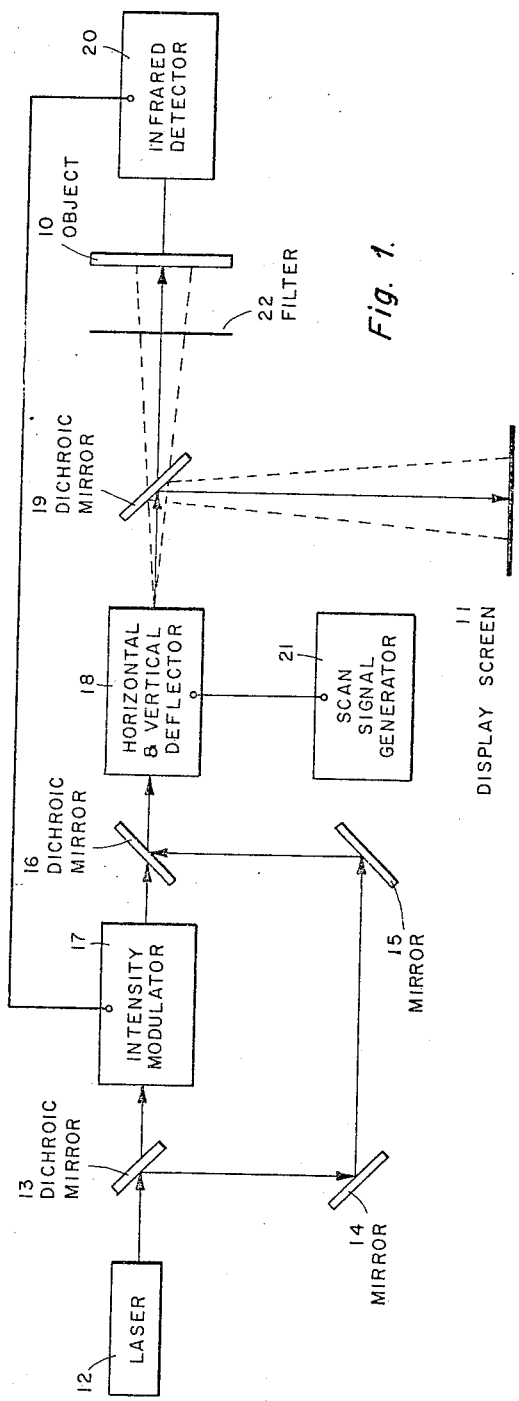
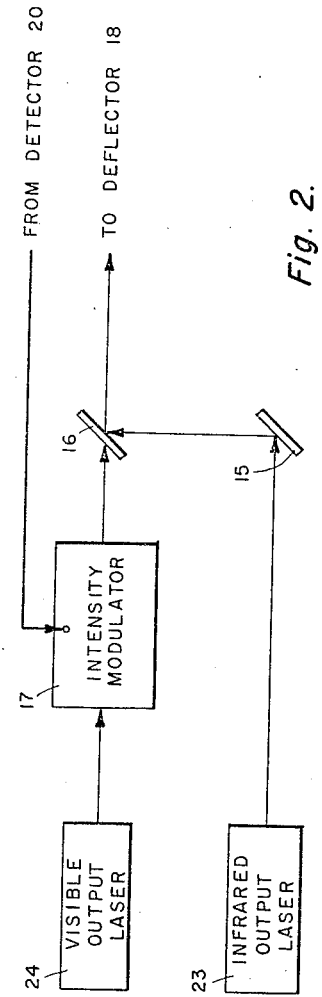
INVENTOR.
JAMES F. BLACK
BY Joseph H. Krediger
ATTORNEY.

United States Patent Office 3,493,754
Patented Feb. 3, 1970

3,493,754
MULTIFREQUENCY LASER IMAGE CONVERTER
James F. Black, Huntington Station, N.Y., assignor to General Telephone & Electronics Laboratories Incorporated, a corporation of Delaware
Filed Mar. 25, 1968, Ser. No. 715,752
Int. Cl. G01t 1/16; H01j 39/00; H04m 5/84
U.S. Cl. 250—83.3
6 Claims

ABSTRACT OF THE DISCLOSURE

An image converter which enables an object to be scanned by an infrared beam and the image of the scanned object to be displayed by a visible beam. The beams are deflected in synchronism and then separated by a dichroic mirror so that the infrared beam scans the object at the same time that the visible beam scans the screen. The infrared image of the object is used to intensity modulate the visible beam for display.

Background of the invention

This invention relates to a laser image converter which permits an object to be scanned by a beam of radiation having a first frequency and the resultant image to be displayed by a beam of radiation having a second frequency. More particularly, the laser image converter enables a semiconductor wafer to be scanned by a beam of infrared radiation and the resultant image to be simultaneously displayed by a beam of visible radiation.

The rapid growth of the semiconductor industry has generated increasing interest in the measurement of the properties of semiconductor material. Among the more important properties of interest are carrier concentration, carrier mobility and the homogeneity of these properties. Generally, these properties are determined by electrical tests, for example the conventional Hall effect measurements. However, electrical measurement techniques require that suitable contacts be formed on the particular sample to be tested. The formation of contacts on the sample permits the carrier concentration and resistivity of the material to be determined but severely limits the determination of the homogeneity of the electrical properties. This limitation arises from the fact that the electrical measurements are determinative only of the properties of the material underlying the contact itself. Thus, the results of electrical tests conducted on a semiconductor wafer may not be representative of the properties at portions of the wafer not immediately adjacent to the contacts.

In addition, electrical measurement techniques, such as the Hall-effect measurement, generally require a sample having a particular geometry. The necessity for samples of particular shapes is characteristic of destructive techniques since the samples tested may not be suitable for further use. Many of the operations involved in preparing samples for electrical measurements require the attention of highly skilled operators, and often each sample must be processed individually. Furthermore, electrical measurement techniques are not readily adaptable to provide a real time or simultaneous display of the measured quantities since it is difficult to provide for rapid mechanical movement of electrical contacts.

The present invention is directed to apparatus which utilizes the optical properties of semiconductor materials to determine carrier concentration, carrier mobility and electrical homogeneity of a wafer of semiconductor material. In addition, the apparatus enables either the surface or the volume of the wafer to be investigated.

Since optical measurement techniques do not normally require the wafer to be physically contacted other than for support, these techniques eliminate the processing steps associated with the formation of electrical contacts and enable an entire wafer, rather than a sample thereof, to be investigated. In addition, optical measurements do not require a special sample geometry and, thus, are essentially non-destructive since the entire subject wafer may be utilized in a subsequent fabrication process.

While the region of the semiconductor wafer that is sampled by electrical measurement techniques is fixed by the sample geometry or by the location and size of the electrical contacts, the use of an optical measuring apparatus enables the sampled region to be readily varied from a point to an area by focusing or defocusing the optical beam scanning the wafer. Also, the optical beam can be narrowly focused and rapidly deflected so that an image of the variations in the electrical properties can be simultaneously displayed.

Summary of the invention

The laser image converter which is the subject of the present invention provides apparatus for scanning an object, such as a semiconductor wafer, with a first beam of radiation and simultaneously displaying the image of the object with a second beam of radiation. The first and second beams of radiation have first and second frequencies, respectively, with the particular beam frequencies being determined by the sensitivity of the object and the display screen.

The apparatus comprises source means for providing the first and second beams at the appropriate frequencies, modulating means positioned adjacent to the source for modulating the intensity of the second beam and means for combining the first and second beams so that they are essentially parallel and collinear, i.e. the beams travel parallel paths. Deflection means are positioned adjacent to the output of the combining means and provide synchronous deflection of the first and second beams in accordance with the particular scan pattern desired.

The first and second beams are essentially parallel when they emerge from the deflection means and are directed to a means for separating the beams. The means for separating the beams may be a dichroic mirror which transmits radiation at one frequency and reflects radiation at other frequencies. The separating means is positioned adjacent to the output end of the deflection means so that the first and second beams are caused to propagate along divergent paths. The first beam travels along a first path to the object being scanned while the second beam is directed to a display screen. Since both beams are deflected in synchronism, the object and the display are simultaneously scanned by the corresponding beam.

The first beam scans the object in a predetermined pattern determined by the drive signal applied to the deflection means. The radiation at the first frequency emanating from the incremental areas of the object (which radiation may be transmitted through the object or reflected therefrom) is converted by detector means positioned to receive the radiation, to a voltage having a magnitude corresponding to the intensity of the radiation incident on the detector. This voltage is supplied to the modulating means which modulates the intensity of the second beam accordingly.

Since the first beam is of constant intensity, the intensity of the radiation striking the detector is determined only by the characteristics of the object. The detected changes in intensity are used to vary the intensity of the second beam which is separated from the first beam prior to the object and directed to a display screen. While the second beam varies in intensity and a portion thereof may be passed by the separating means along with the first beam, the fact that the first and second beams have different frequencies enables the effects of incomplete separation to be readily minimized by the use of additional filters and the response characteristic of the detector.

In one embodiment of the invention, a laser providing a first beam having a frequency in the infrared portion of the frequency spectrum and a second beam having a frequency in the visible portion is employed as the source means. The infrared beam is separated from the visible beam by dichroic mirrors. The visible beam is passed through an intensity modulator and then combined with the infrared beam. The two beams, when combined, are collinear and are supplied to an optical deflector which provides synchronous deflection therefor.

After separation, the infrared beam is used to scan a semiconductor wafer and the visible beam is directed to a display screen. The detected changes in the intensity of the infrared radiation are utilized to modulate the intensity of the visible beam and provide a simultaneous read-out of the infrared transmission or reflectance of the semiconductor wafer. The transmission and reflectivity of a semiconductor are, at a particular infrared wavelength, functions of the number of free charge carriers and the carrier mobility. Thus, the visible image generated at the display screen can provide a map of local variations in carrier concentration and/or carrier mobility across the wafer. In addition, the map reveals certain crystal inhomogeneities due to the scattering of the infrared beam within the wafer.

Further features and advantages of the invention will become more readily apparent from the following detailed description of a specific embodiment when taken in conjunction with the accompanying drawings.

Brief description of the drawings

FIG. 1 is a block diagram of one embodiment of the invention.

FIG. 2 is a block diagram of a modification of the embodiment of FIG. 1.

Referring now to FIG. 1, a block diagram is shown of a laser image converter for scanning an object 10 with a first beam of radiation from a laser 12 and simultaneously converting and displaying the detected image thereof with a second beam of radiation from the laser. The detected image is generated by the first beam of radiation at a first frequency and is displayed at screen 11 by the second beam of radiation at a second frequency.

While different light sources may be used, the laser is best suited because it is capable of very high brightness and its output is coherent. Since it emits coherent light, all of the energy in the beam may be concentrated in an extremely small area. Thus, the laser is capable of providing high resolution systems wherein the beam diameter is small, for example 10 microns. In the embodiment of FIG. 1, the active medium in the laser 12 is a He-Ne mixture which provides a first beam at 33,900 A. and a second beam at 6328 A.

The first and second beams emitted by laser 12 impinge upon a frequency selective reflecting surface 13, such as a dichroic mirror, which separates the first and second beams. The first beam is reflected and directed, in sequence, to mirrors 14 and 15 and to dichroic mirror 16. Dichroic mirrors are typically formed of a plurality of dielectric layers, such as ZnS and $MgF_2$, and are characterized by the fact that they reflect radiation of certain wavelengths and transmit radiation of other wavelengths. As a result, the second beam of radiation passes through dichroic mirror 13 to intensity modulator 17. As mentioned previously, the second beam consists of visible radiation. Upon emerging from the intensity modulator 17, the visible beam is combined with the first or infrared beam by dichroic mirror 16 so that the two beams are collinear.

The intensity modulator 17 is utilized to vary the amplitude of the visible beam passing therethrough in accordance with the output voltage of detector 20. Many different modulators may be utilized in the present apparatus. In particular, intensity modulators utilizing the electro-optic effect of crystals such as KDP and ADP are preferred due to the ability of the crystals to respond to high frequency electric fields. One type of electro-optic modulator suitable for use is the Twyman-Green interferometer. Another type of modulator which may be employed comprises, in sequence, a first polarizer, an electro-optic crystal and a second polarizer oriented at 90 degrees to the first polarizer. The application of an electric field across the crystal rotates the plane wave of the polarizer and provides a component of the beam which has a direction of polarization parallel to that of the second polarizer. Consequently, the intensity of the beam passed by the second polarizer is a function of the applied field.

The visible beam emerges from intensity modulator 17 and impinges upon dichroic mirror 16. Dichroic mirror 16 is adapted to pass visible radiation and reflect infrared radiation and is oriented as shown in FIG. 1 so that the visible and infrared beams are collinear as they leave mirror 16. The collinear beams travel along a common optical path to deflector 18 which provides the two-dimensional horizontal and vertical deflection necessary to establish a raster-type scan pattern. The deflector 18 may be either a rotating mirror, a piezoelectrically driven mirror structure as disclosed in the copending U.S. patent application S.N. 518,324, filed Jan. 3, 1966 in the name of Vernon J. Fowler or an electro-optic beam deflector of the type described in U.S. patent 3,357,771.

The particular scan pattern provided is determined by the signals applied to deflector 18 by scan-signal generator 21. Generally, in the absence of an applied scan signal the input beams are undeflected and pass through the central portion of the deflector. Upon emerging from the deflector, the collinear beams impinge upon the central portion of dichroic mirror 19. The dichroic mirror transmits one beam and reflects the other. In the embodiment shown, the visible beam is reflected by dichroic mirror 19 and is directed to display screen 11. The infrared beam is transmitted by mirror 19 and passes through filter 22 and impinges upon object 10 which, typically, is a semiconductor wafer.

Since the beams pass through the deflector, the beams are deflected in synchronism and therefore scan the mirror 19. This results in the visible beam scanning the display screen at the same time that the infrared beam is scanning the object 10. While filter 22, typically an anti-reflection coated $TiO_2$ thin wafer, is positioned between mirror 19 and object 10 to eliminate any portion of the visible beam not reflected by mirror 19, the object itself may act as a filter in which case filter 22 may be omitted.

The infrared detector 20 is positioned proximate to object 10 and receives infrared radiation transmitted therethrough. The detector 20, which may be an InAs intrinsic IR detector, is responsive to the variations in the intensity of the infrared radiation incident thereon. Since the infrared beam is not passed through intensity modulator 17, the beam is of constant intensity and the variations in intensity of the infrared radiation on detector 20 are due to variations in the characteristics of the object. In the determination of the carrier concentration of semiconductor materials, the reflectance characteristics of the wafer are normally utilized. This mode of operation is provided by positioning detector 20 so that it is responsive to radiation reflected from the wafer.

The detector 20 provides a voltage which is a function of the intensity of the variations incident thereon. The output terminal of the detector is coupled to the input terminal of the intensity modulator 17 so that the intensity of the visible beam is varied in accordance with the intensity of the infrared light incident upon the detector. The visible beam is directed to screen 11 so that the infrared image generated by the scanning of the object is simultaneously displayed as a visible image on the screen. Thus, the present system converts the infrared image into a visible image for simultaneous display.

The embodiment of FIG. 1 utilizes a He-Ne laser as a single source of both the infrared and the visible beams. However, individual lasers 23 and 24 may be utilized in the manner shown in FIG. 2 wherein the visible beam is directed to modulator 17 and the infrared beam is combined therewith at the output of the modulator.

While the above description of the invention has referred to specific embodiments, it will be recognized that many modifications and variations may be made therein without departing from the spirit and scope of the invention.

What is claimed is:

1. Apparatus for scanning an object with a beam of radiation having a first frequency and displaying an image thereof on a screen with a beam of radiation having a second frequency which comprises:
   (a) source means for providing a first beam of radiation having a first frequency and a second beam of radiation having a second frequency;
   (b) modulating means positioned adjacent to said source, said means modulating the second beam of radiation emitted by the source in accordance with a signal applied thereto;
   (c) means for combining said first and second beams of radiation so that said beams are essentially parallel, said means for combining being positioned adjacent to the output end of said modulating means;
   (d) deflection means positioned adjacent to said means for combining said first and second beams, said deflection means deflecting the combined beams;
   (e) means for separating said first and second beams positioned adjacent to the output end of said deflector whereby said first beam propagates along a first path to the object to be scanned and said second beam propagates along a second path to the display screen, and
   (f) detector means responsive to radiation at the first frequency of the first beam, said detector means being positioned to receive radiation emanating from said object, the output of said detector means being coupled to said modulating means whereby said second beam at the second frequency is intensity modulated in accordance with the intensity of the light at said first frequency emanating from the object.

2. Apparatus in accordance with claim 1 wherein said means for combining said first and second beams of radiation so that the beams are essentially parallel is a first dichroic means positioned adjacent to the output end of said modulating means and said means for separating said first and second beams is a second dichroic means positioned adjacent to the output end of said deflection means, said second dichroic means substantially transmitting one of said beams and substantially reflecting the other of said beams, said second beam being directed to a display screen.

3. Apparatus in accordance with claim 2 wherein said source means is a multi-wavelength laser which provides first and second beams of radiation at first and second frequencies respectively, said apparatus further comprising third dichroic means positioned between said laser and said modulating means, said third dichroic means separating said first and second beams so that said second beam enters said modulating means and said first beam is directed to said first dichroic means.

4. Apparatus in accordance with claim 3 wherein said laser provides a first beam having a frequency in the infrared portion of the spectrum and a second beam having a frequency in the visible portion of the spectrum.

5. Apparatus in acordance with claim 2 wherein said source comprises first and second lasers, said first laser providing a first beam of radiation having a frequency in the infrared portion of the spectrum, said first beam being directed to said first dichroic means, and said second laser providing a second beam having a frequency in the visible portion of the spectrum, said second beam being directed to said modulating means.

6. Apparatus in accordance with claim 5 wherein said modulating means is an intensity modulator.

References Cited

UNITED STATES PATENTS 3,436,473  4/1969  McMann _____ 178—6.8

ARCHIE R. BORCHELT, Primary Examiner

MORTON J. FROME, Assistant Examiner

U.S. Cl. X.R.

178—6.7, 7.3; 350—160; 355—80